US006466425B1

(12) United States Patent
Shirakawa et al.

(10) Patent No.: US 6,466,425 B1
(45) Date of Patent: Oct. 15, 2002

(54) INSULATING ARRESTER CAPABLE OF PROVIDING A VOLTAGE DISTRIBUTION THAT IS SUBSTANTIALLY SYMMETRICAL AROUND THE CENTER OF THE OVERALL HEIGHT OF THE ARRESTER

(75) Inventors: Shingo Shirakawa; Satoshi Watahiki, both of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/434,287

(22) Filed: Nov. 5, 1999

(30) Foreign Application Priority Data

Nov. 6, 1998 (JP) .......................................... 10-315639

(51) Int. Cl.[7] ................................................ H02H 9/00
(52) U.S. Cl. ......................... 361/117; 361/111; 361/118
(58) Field of Search ................................ 361/111, 117, 361/118, 138, 126–128; 338/7, 20, 21, 52, 54, 204; 315/36

(56) References Cited

U.S. PATENT DOCUMENTS 4,262,318 A * 4/1981 Shirakawa et al. ......... 361/127
4,276,578 A 6/1981 Levinson et al.
4,851,955 A * 7/1989 Doone et al. ............... 361/117
5,039,452 A * 8/1991 Thompson et al. ......... 252/518

FOREIGN PATENT DOCUMENTS

JP 401189901 A * 7/1989

OTHER PUBLICATIONS

S. Shirakawa et al, "DC and AC Contamination Characteristics of Two Staged Porcelain Type Surge Arresters", 10th International Symposium on High Voltage Engineering, Aug. 25–29, 1997, pp. 1–4.

* cited by examiner

*Primary Examiner*—Stephen W. Jackson
(74) *Attorney, Agent, or Firm*—Mattingly, Stanger & Malur, P.C.

(57) ABSTRACT

Provided is an arrester excellent in a limit voltage characteristics which can withstand a contamination phenomenon of a porcelain bushing surface, and a surge absorption. Metal plates each having a thickness greater than a zinc oxide element portion does using high withstand voltage zinc oxide elements are arranged to suppress a rise in temperature of the zinc oxide elements. By employing the above means, it is possible to realize an arrester capable of suppressing a rise in temperature of the zinc oxide elements and which is low in a limit voltage and has higher performance.

20 Claims, 12 Drawing Sheets

INSULATING ARRESTER CAPABLE OF PROVIDING A VOLTAGE DISTRIBUTION THAT IS SUBSTANTIALLY SYMMETRICAL AROUND THE CENTER OF THE OVERALL HEIGHT OF THE ARRESTER

BACKGROUND OF THE INVENTION

1. Field of the Invention

The present invention relates to an arrester, and particularly, to an arrester in which a plurality of zinc oxide elements are laminated within a porcelain bushing or within a tank.

2. Description of the Prior Art

In conventional insulator type arresters, it was feared of bringing forth a phenomenon that when the surface of a porcelain bushing is locally unevenly contaminated, an excessive electrical stress is applied to a part of the zinc oxide elements for a long period of time whereby the zinc oxide elements are generated in heat, finally resulting in reckless running, as mentioned in S. Shirakawa et al.: DC and AC Contamination Characteristics of Two Staged Porcelain Type Surge Arresters, 10th ISH, Montreal, 1997.

That is to say, it was feared that when the zinc oxide elements are thermally unbalanced, a leaky current of the zinc oxide elements increases, whereby a temperature of the zinc oxide elements rapidly rises, resulting in thermally reckless running of the zinc oxide elements. Further, it was feared that when, in a state that a temperature of the zinc oxide elements rises, a large thunder surge or a frequent opening- and closing surge in a system is absorbed, the temperature of the zinc oxide elements assumes a state that exceeds a thermal balance of the zinc oxide elements (for example, the temperature of the zinc oxide elements exceeds approximately 200° C.), whereby a leaky current of the zinc oxide elements abnormally increases, resulting in a high possibility of thermally reckless running.

The basic characteristics of zinc oxide elements for an arrester are evaluated by a terminal voltage of the zinc oxide elements in conductance of 1 mA and a thickness of the zinc oxide elements. In the prior art, the zinc oxide elements of approximately 200 V/mm have occupied a main stream.

In the insulator type arrester, higher performance attained by reduction in a limit voltage has been expected for improvement in protective level. However, since an insulator type arrester capable of suppressing a rise in temperature of zinc oxide elements caused by contamination of the surface of a porcelain bushing as less as possible is not realized, the higher performance of the insulator type arrester has been feared.

Also in a tank type arrester, it has been feared, similarly, due to the rise in zinc oxide elements when a surge of the zinc oxide elements is absorbed, of higher performance of the arrester and achievement of compactness of the arrester resulting from reduction in a using volume of the zinc oxide elements.

That is, in the case where conventional zinc oxide elements of 200 V/mm are used, for example, in an insulator type of 266 kV, about 95 zinc oxide elements are laminated. On the other hand, in the case where zinc oxide elements of high pressure resistance are used, for example, and in the case where zinc oxide elements of approximately 400 V/mm are used, about 48 zinc oxide elements are laminated; and in the case where zinc oxide elements of approximately 300 V/mm are used, about 63 zinc oxide elements are laminated, by which the number of zinc oxide elements can be reduced as compared with prior art.

However, in a state that the number of zinc oxide elements is reduced, a voltage distribution between the zinc oxide elements is affected by grounded electrostatic capacity and becomes uneven, posing a problem in high voltage life characteristics. It is contemplated that a length of a porcelain bushing is shortened to improve the potential distribution between zinc oxide elements. However, since an external creeping flashover occurs considering contamination conditions outdoor, the above length cannot be shortened recklessly. In designing an insulator type arrester, a porcelain bushing contamination resistant voltage and an optimal arrangement of zinc oxide elements are essential.

It is a first object of the present invention to provide an insulator type arrester capable of suppressing a rise in temperature of zinc oxide elements caused by contamination of a porcelain bushing surface. A second object of the invention is to provide an insulator type arrester capable of suppressing a rise in temperature of zinc oxide elements caused by contamination of a porcelain bushing surface, and of achieving higher performance resulting from reduction in a limit voltage. A third object of the invention is to provide an insulator type arrester capable of suppressing a rise in temperature of zinc oxide elements caused by contamination of a porcelain bushing surface, of achieving higher performance resulting from reduction in a limit voltage, and of providing an arrangement wherein a voltage distribution between zinc oxide elements is not uneven by being affected by a grounded electrostatic capacity. A fourth object of the invention is to provide a high performance tank type arrester capable of achieving higher performance of an arrester and reduction in a volume of zinc oxide elements to be used similarly to the insulator type arrester.

SUMMARY OF THE INVENTION

A first insulator type arrester according to the present invention for achieving the aforementioned first object comprises an insulting rod provided within a porcelain bushing, a laminate body in which a plurality of metal plates having a thickness greater than a single zinc oxide element does are laminated on upper and lower ends of zinc oxide elements through the insulating rod, a conductor made of metal provided on the lower end of the laminate body, and a resilient member provided on the upper end of the laminate body to press the laminate body into the porcelain bushing.

A second insulator type arrester according to the present invention for achieving the aforementioned second object comprises an insulting rod provided within a porcelain bushing, a laminate body in which a plurality of metal plates are laminated on upper and lower ends of zinc oxide elements through the insulating rod, a conductor made of metal provided on the lower end of the laminate body, and a resilient member provided on the upper end of the laminate body to press the laminate body into the porcelain bushing, wherein the zinc oxide elements have characteristics of an operation starting voltage of 280 V/mm to 500 V/mm.

The zinc oxide elements are featurized by comprising zinc oxide particles, and a grain boundary of a metal additive composed of bismuth oxide, antimony oxide, cobalt oxide, manganese carbonate, chromium oxide, nickel oxide, boron oxide, magnesium carbonate, silver oxide, silicone oxide, and aluminum nitrate. Furthermore, the zinc oxide elements comprise zinc oxide particles of particle size of 1 to 5 $\mu$m, and particle size of 0.05 to 0.6 $\mu$m of a metal additive composed of bismuth oxide, antimony oxide, cobalt oxide, manganese carbonate, chromium oxide, nickel oxide, boron oxide, magnesium carbonate, silver oxide, silicone oxide, and aluminum nitrate, thus emerging the characteristics of an operation starting voltage of 280 V/mm to 500 V/mm.

A third insulator type arrester according to the present invention for achieving the aforementioned third object comprises an insulting rod provided within a porcelain bushing, a laminate body in which a plurality of metal plates are laminated on upper and lower ends of zinc oxide elements through the insulating rod, a conductor made of metal provided on the lower end of the laminate body, and a resilient member provided on the upper end of the laminate body to press the laminate body into the porcelain bushing, wherein the zinc oxide elements having characteristics of an operation starting voltage of 280 V/mm to 500 V/mm, and the metal plate has a thickness greater than a single zinc oxide element. Alternatively, the metal plate may be divided into a plurality of plates having a thickness smaller than a single zinc oxide element does.

Further, in arranging the metal plates having a thickness larger than a single zinc oxide element does, metal plates increased in thickness by two times, three times, or n times greater than that of the zinc oxide element are arranged stepwise on the lower ends of the zinc oxide elements along the grounded side while adapting to a voltage distribution of an arrester.

A fourth tank type arrester according to the present invention for achieving the aforementioned fourth object comprises a metal shield and an insulating rod provided within a tank, a laminate body in which a plurality of metal plates are laminated on upper and lower ends of zinc oxide elements through the insulating rod, a conductor made of metal provided on the lower end of the laminate body, and a resilient member provided on the upper end of the laminate body to press the laminate body into the tank, wherein the metal plate has a thickness equal to that of a single zinc oxide element in the metal shield portion where an electric field is severe (a portion in which a voltage distribution rate is in excess of 1.0) as shown in a potential distribution of the tank type arrester in FIG. 13, and the metal plates increased in thickness by two times, three times, or n times greater than that of the zinc oxide element are arranged stepwise on the grounded side.

In the first, second and third arresters, the ratio between 10 kA and the operation voltage in the limit voltage characteristics is in the range of 1.9 to 2.4.

DETAILED DESCRIPTION OF THE PREFERRED EMBODIMENTS

Embodiments of an insulator type arrester and a tank type arrester according to the present invention will be described hereinafter with reference to the drawings.

Figure 1:
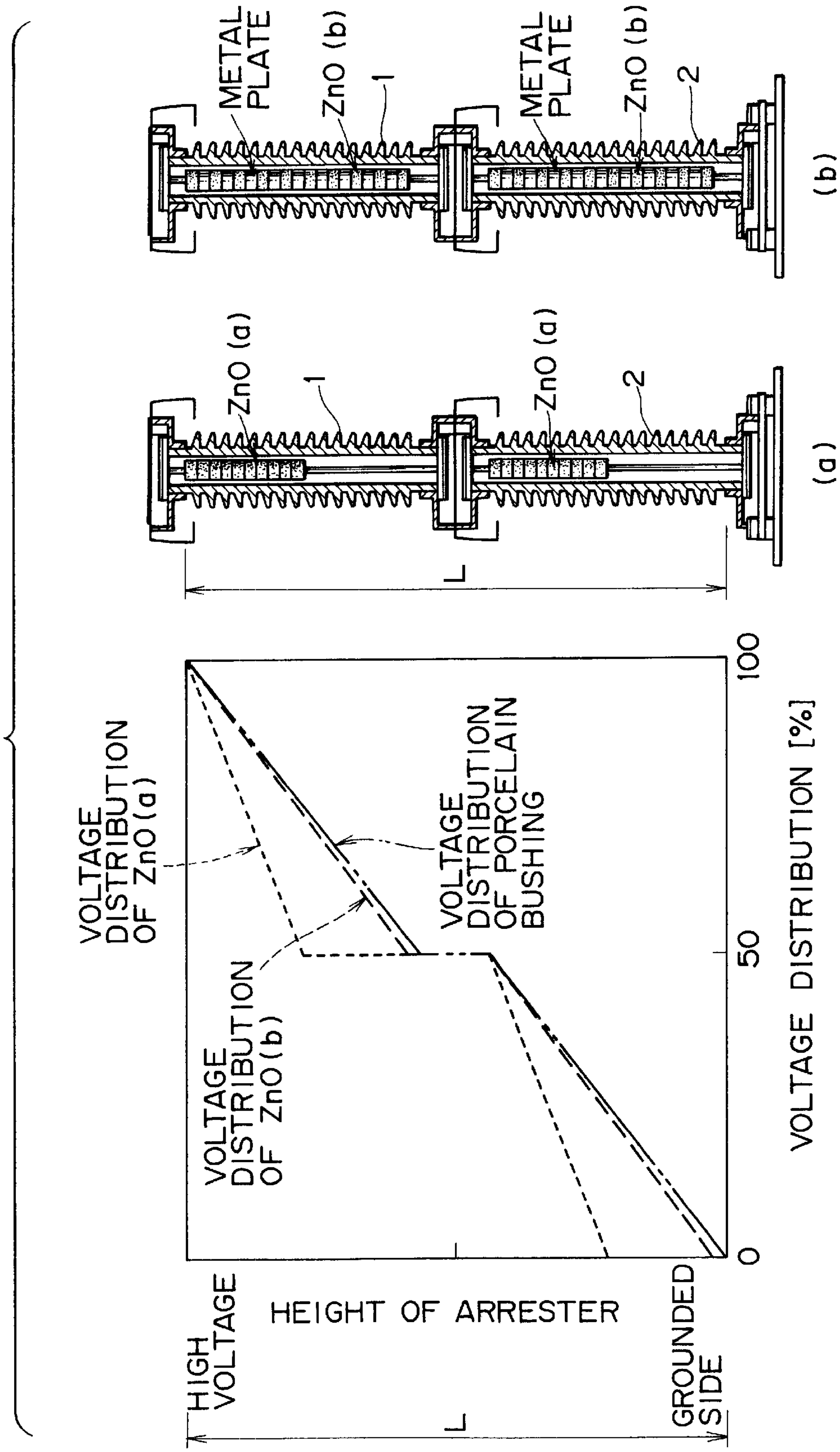
FIG. 1 is a constitutional view of a two staged arrester according to the present invention, and a voltage distribution view.
Figure 2:
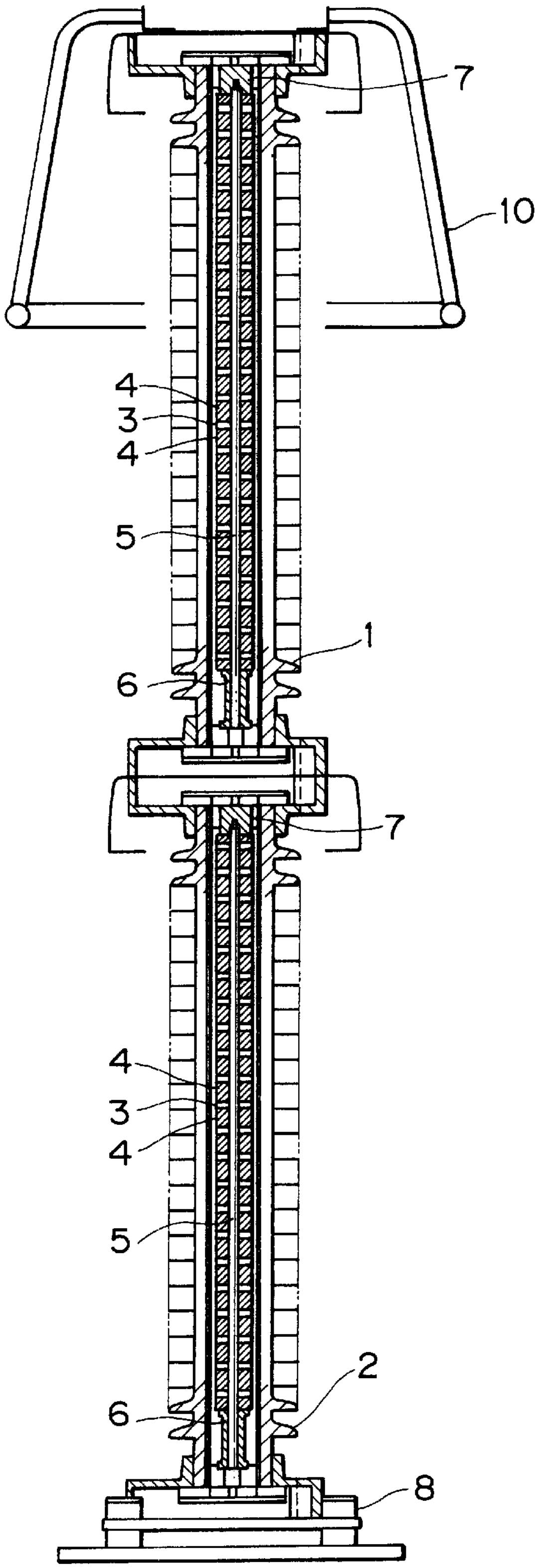
FIG. 2 is a sectional view showing a construction of an insulator type arrester according to a first embodiment of the present invention.
Figure 3:
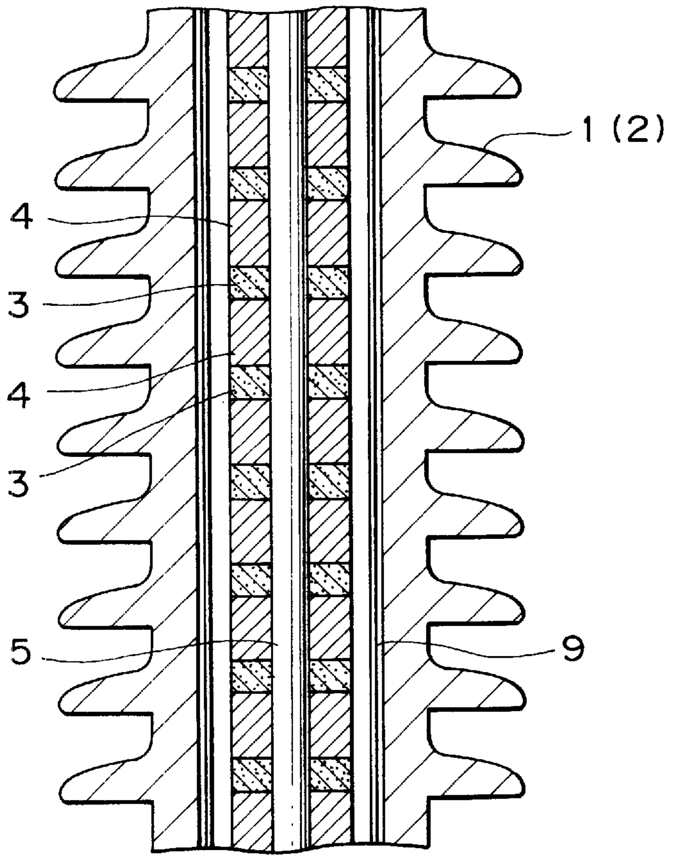
FIG. 3 is an enlarged view showing a zinc oxide element portion of FIG. 2.
Figure 4:
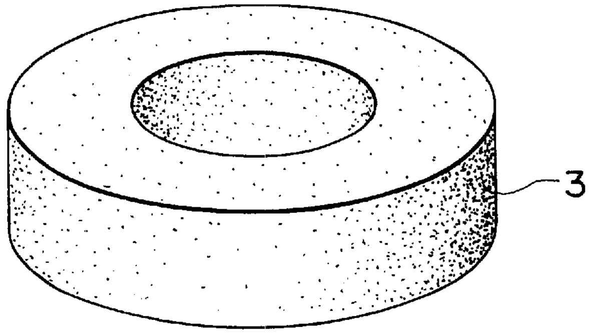
FIG. 4 is a perspective view showing a shape of a zinc oxide element.

FIGS. 1 to 4 are drawings showing an insulator type arrester according to a first embodiment; FIG. 1 is a constitutional view of a two staged arrester and a voltage distribution view; FIG. 2 is a sectional view showing a construction of an insulator type arrester; FIG. 3 is an enlarged view showing a zinc oxide element portion of FIG. 2; and FIG. 4 is a perspective view showing a shape of a zinc oxide element of FIG. 3.

In the drawings, reference numeral 1 designates an upper-stage porcelain bushing, and 2 a lower-stage porcelain bushing. The present embodiment shows an example of a two staged type arrester composed of a unit on the side of the upper-stage porcelain bushing 1 and a unit on the side of the lower-stage porcelain bushing 2. Further, if a three-stage is employed, a high rated arrester can be realized. The porcelain bushings 1 and 2 are formed of porcelain or polymer.

Within the upper-stage porcelain bushing 1 and the lower-stage porcelain bushing 2 are provided an insulating tube 9, within which is provided an insulating rod 5 extending in a vertical direction in a linear fashion. A laminate body in which a plurality of metal plates 4 in the shape of a doughnut are arranged on upper and lower ends of a zinc oxide element 3 in the shape of a doughnut as shown in FIG. 3 is inserted into the insulating rod 5.

For the zinc oxide element 3, higher voltage resistant one having characteristics of 280 V/mm to 500 V/mm of operation starting voltage is used. The metal plate 4 has a function of absorbing heat generated in the zinc oxide element 3. The metal plate 4 used has a thickness greater than the zinc oxide element 3 does.

A conductor 6 made of metal is provided on the lower end side of the laminate body to support the laminate body. An resilient member or a spring 7 is provided on the upper end side of the laminate body, the laminate body being adjacent within the porcelain bushing, concretely within the insulating tube 9. The spring 7 encases a short-circuiting connecting conductor in consideration that a discharge current of an arrester is not affected. A partially umbrella-like shield 10 is provided on the upper end side of the upper-stage porcelain bushing 1, and an insulating base 8 is provided on the lower-stage side of the lower-stage porcelain bushing 2.

According to the present embodiment, the number of laminate body of zinc oxide elements is reduced by using zinc oxide elements having the characteristics of an operation starting voltage of 280 V/mm to 500 V/mm, and the metal plates each having a thickness greater than the zinc oxide element are arranged on the upper and lower ends of the zinc oxide elements. Therefore, it is possible to absorb heat of the zinc oxide elements generated by a leaky current transitively flowing into the zinc oxide elements due to the contamination of the porcelain bushing surface, and achieve higher performance of an arrester resulting from lowering of a limit voltage.

In the constitution of the insulator type arrester, the arrangement of the insulating tube 9 is a very effective method for preventing internal elements from scattering to the porcelain bushing, with respect to the pressure release performance (explosion proof performance) of an arrester. However, since the insulating state relative to the porcelain bushing is present with respect to the heat release of the internal zinc oxide elements, there is adversely affected with respect to the heat release characteristics. In a sense of improving this, the provision of a laminate body of a plurality of metal plates each having a thickness greater than the zinc oxide element on the upper and lower ends of the zinc oxide elements is very effective in a sense of preventing reckless thermal running to the zinc oxide elements.

In the insulator type arrester obtained according to the present embodiment, the ratio between 10 kA and the operation voltage in the limit voltage characteristics was in the range of 1.9 to 2.4, per unit.

Further, since according to the present embodiment, the thickness of the metal plate is greater than that of the zinc oxide element, even if the number of laminate bodies of the zinc oxide elements is reduced using the zinc oxide elements having the characteristics of 280 V/mm to 500 V/mm of operation starting voltage, the voltage distribution between the zinc oxide elements is not uneven to undesirable extent upon receipt of influence of the grounded electrostatic capacity.

Further, adoption of the metal plate greater than the zinc oxide element in thickness is equivalent to the case where about two times of high withstand voltage elements are used, thereby enabling an increase of apparent thermal capacity to about two times. In the case where a porcelain bushing of long leaky distance is used, it is possible to apply a metal plate of greater thickness, whereby the heat absorbing amount of the zinc oxide elements can be increased, and in addition, the transitional influence on the leaky current of the zinc oxide elements when in discharge caused by contamination of the external porcelain bushing can be reduced. Further, in the case where the limit voltage is desired to be further reduced, since the number of zinc oxide elements is reduced, insertion of the metal plates is easy, thus enabling the constitution of an arrester excellent in heat release characteristics of the zinc oxide elements.

Figure 6:
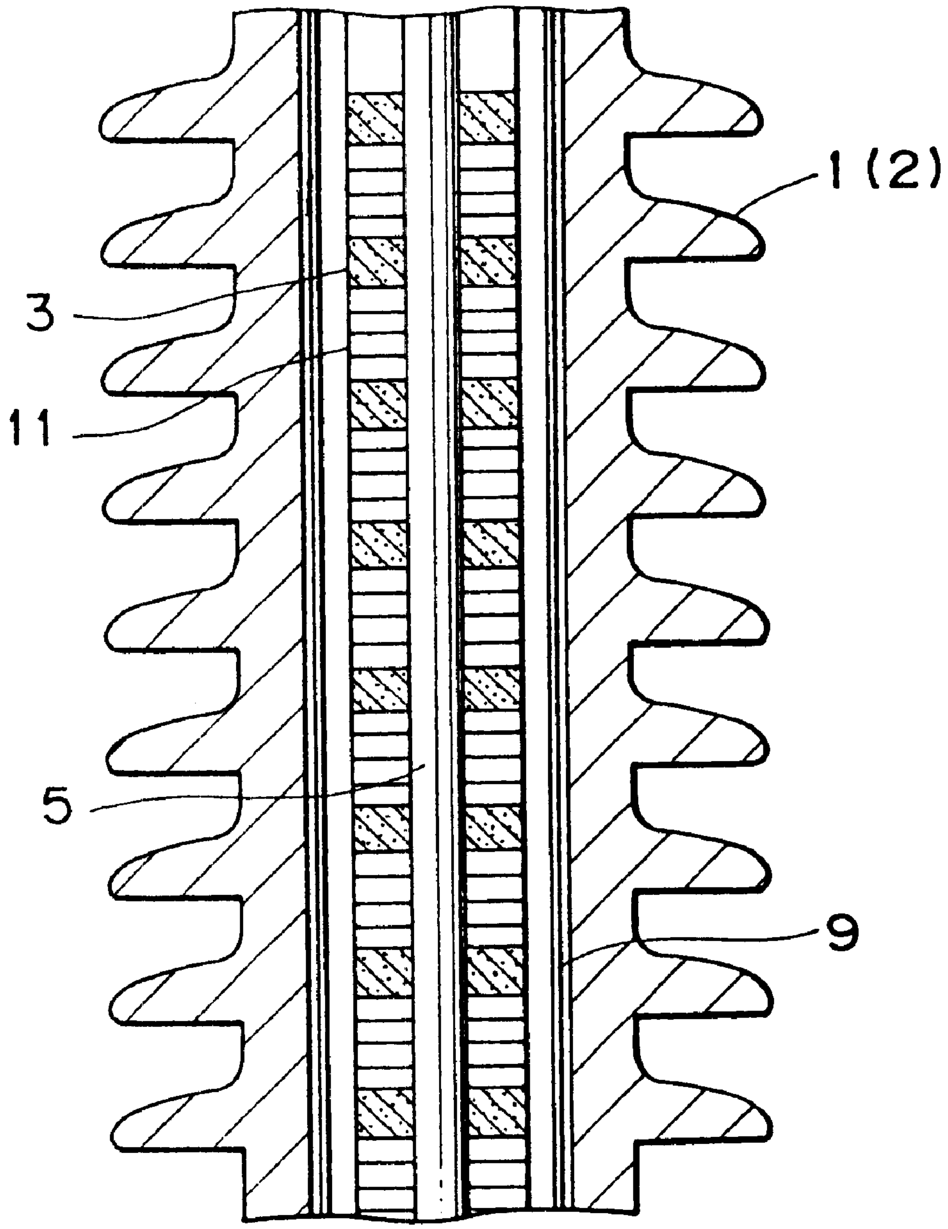
FIG. 6 is an enlarged view showing a zinc oxide element portion.

FIG. 6 is a view showing an insulator type arrester according to a second embodiment, which is an enlarged view of a zinc oxide element portion. The present embodiment also shows an example of a two staged insulator type arrester similar to the previous example. In the present embodiment, the metal plates 4 arranged on the upper and lower ends of the zinc oxide element 3 are divided into a plurality (four in the present embodiment) of smaller portions 11. Other constitutions are similar to the previous example, description of which is omitted.

As in a basic voltage distribution of the insulator type arrester (two-stage) (voltage distribution between the zinc oxide elements, which is a voltage distribution value determined by an electrostatic capacity peculiar to the zinc oxide element and a grounded electrostatic capacity), there is a potential difference between the zinc oxide element and the porcelain bushing by arrangement of zinc oxide elements with respect to the potential distribution of the porcelain bushing. When the porcelain bushing is contaminated, the aforesaid influence increases so that an excessive electric stress is generated.

According to the insulator type arrester of the present invention, the voltage distribution of the zinc oxide element can be made closer by the voltage distribution of the porcelain bushing by providing the metal plate having a thickness greater than the zinc oxide element on the upper and lower ends of the zinc oxide elements, and the potential difference between the porcelain bushing surface and the zinc oxide element can be lessened. Further, here, one having the characteristics of 280 V/mm to 500 V/mm of operation starting voltage as a zinc oxide element is used, and therefore, heat of the zinc oxide element generated by a leaky current transitionally flowing into the zinc oxide element due to the contamination of the porcelain bushing surface can be absorbed by the metal plate having the thickness greater than the zinc oxide element does, and the limit voltage can be reduced to provide the higher performance of the arrester. Accordingly, it is possible to provide an insulator type arrester capable of suppressing the rise in temperature of the zinc oxide element due to the contamination of the porcelain bushing surface, and capable of providing the higher performance caused by the reduction in the limit voltage.

According to the insulator type arrester of the present invention, the metal plates having the thickness greater than that corresponding to the zinc oxide element are provided on the upper and lower ends of the zinc oxide elements, and the thickness of the metal plates is gradually enlarged along the grounded vertical side to have the characteristics of an operation starting voltage of 280 V/mm to 500 V/mm, whereby heat of the zinc oxide element generated by a leaky current transitionally flowing into the zinc oxide element due to the contamination of the porcelain-bushing surface can be absorbed by the metal plate having the thickness greater than the zinc oxide element does, and the limit voltage can be reduced to provide the higher performance of the arrester. Accordingly, it is possible to provide an insulator type arrester capable of suppressing the rise in temperature of the zinc oxide element due to the contamination of the porcelain bushing surface, and capable of providing the higher performance caused by the reduction in the limit voltage. Furthermore, it is possible to realize an arrester in which the potential difference between the porcelain bushing surface and the zinc oxide element is reduced so that the excessive voltage to the element surface when contaminated can be suppressed and which is excellent in contamination resistant characteristics.

While the case has been described in which the doughnut shaped zinc oxide element is used in the present embodiment, it is to be noted that also in the case where a disk-like zinc oxide element is used, similar effects can be obtained.

Since according to the present embodiment, the metal plate is divided into a plurality of parts, and the thickness of the metal plate can be suitably adjusted, also in the case where the metal plate has a thickness smaller than the zinc oxide element does, easy setting can be attained, and the cost can be reduced.

Figure 5:
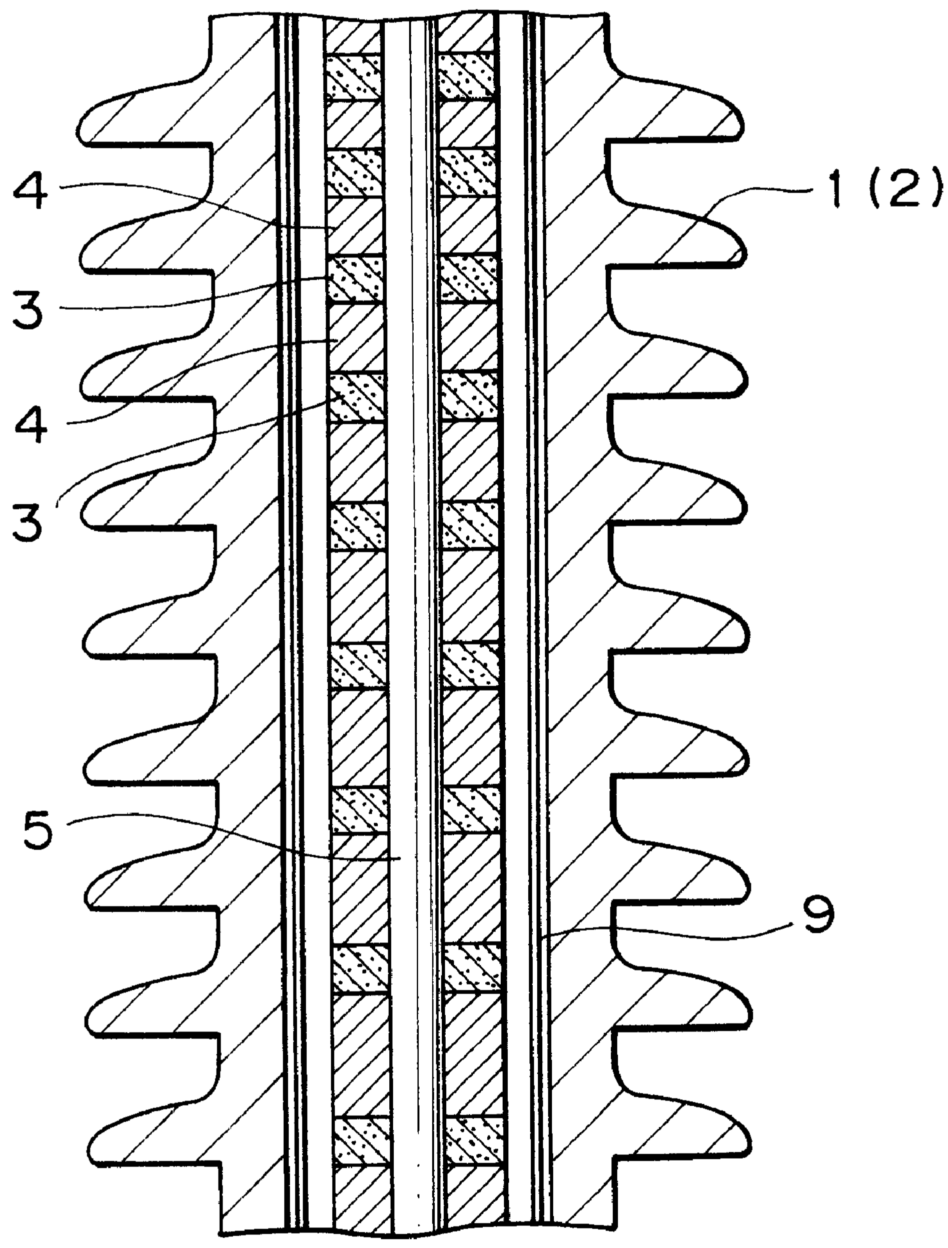
FIG. 5 is an enlarged view showing a zinc oxide element portion of FIG. 7.
Figure 7:
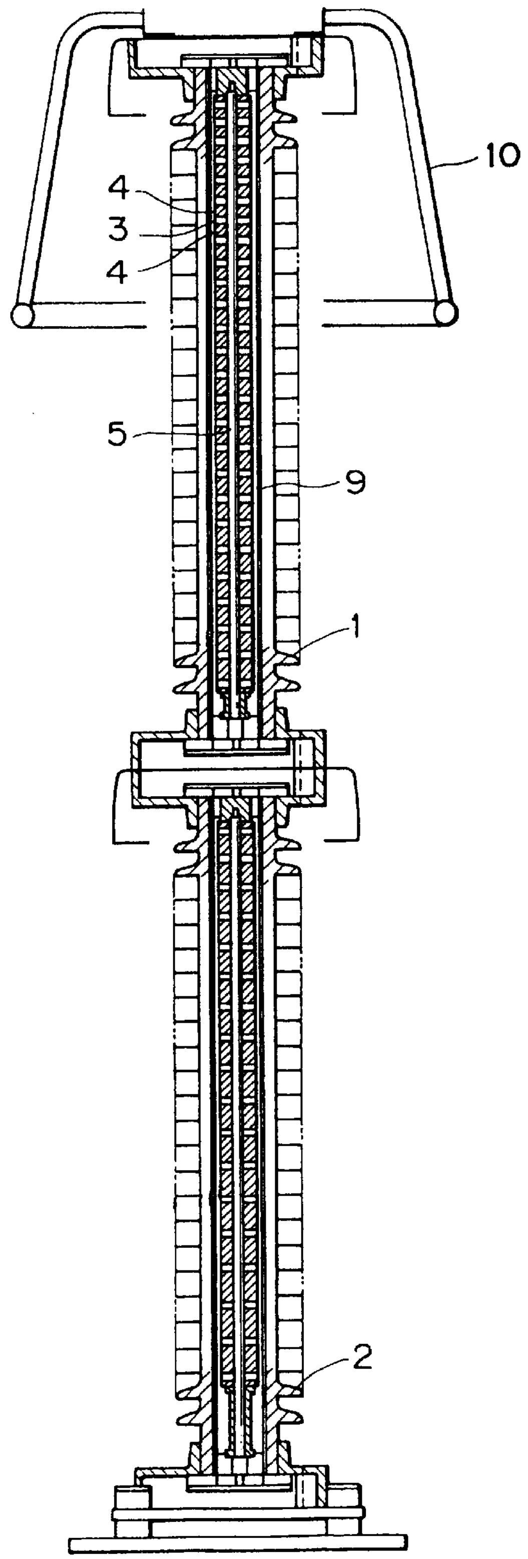
FIG. 7 is an internal construction view of an insulator type arrester according to a third embodiment of the present invention.

FIG. 7 shows an example of a two staged insulator type arrester similar to the previous example. FIG. 5 is a view showing an insulator type arrester according to a third embodiment, which is an enlarged view of a zinc oxide element portion. In the present embodiment, in the metal plates 4 arranged on the upper and lower ends of the zinc oxide element 3, the thickness of the metal plate is gradually increased along the grounded vertical side. Further, the thickness of the metal plate is set to a thickness greater than that of a single zinc oxide element, and the metal plates each having a thickness greater than the zinc oxide element are arranged stepwise at the grounded side to further improve the voltage distribution.

It is possible to realize an arrester in which the potential difference between the porcelain bushing surface and the zinc oxide element is reduced so that the excessive voltage to the element surface when contaminated can be suppressed and which is excellent in contamination resistant characteristics.

Figure 8:
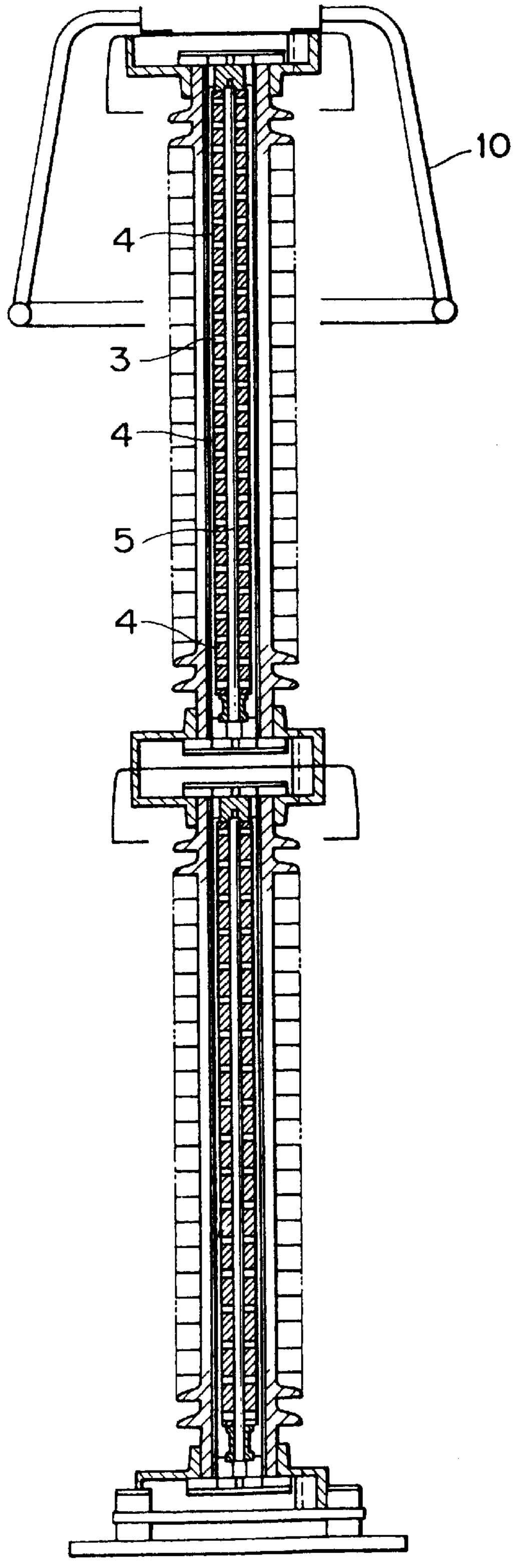
FIG. 8 is an internal construction view of an insulator type arrester according to a second embodiment of the present invention.

FIG. 8 shows an example of a two staged insulator type arrester similar to the previous example. Since in the upper stage and the lower stage in FIG. 8, normally, there occurs a difference in excessive voltage of about 1.05 to 1.3 times on the upper-stage side due to the influence of the grounded electrostatic capacity, and there is provided, in the metal plates having a thickness in excess of that of the zinc oxide elements, a difference between the upper stage and the lower stage. This method can be realized more simply in terms of cost as compared with the aforementioned method in which the metal plates are adjusted stepwise.

Figure 9:
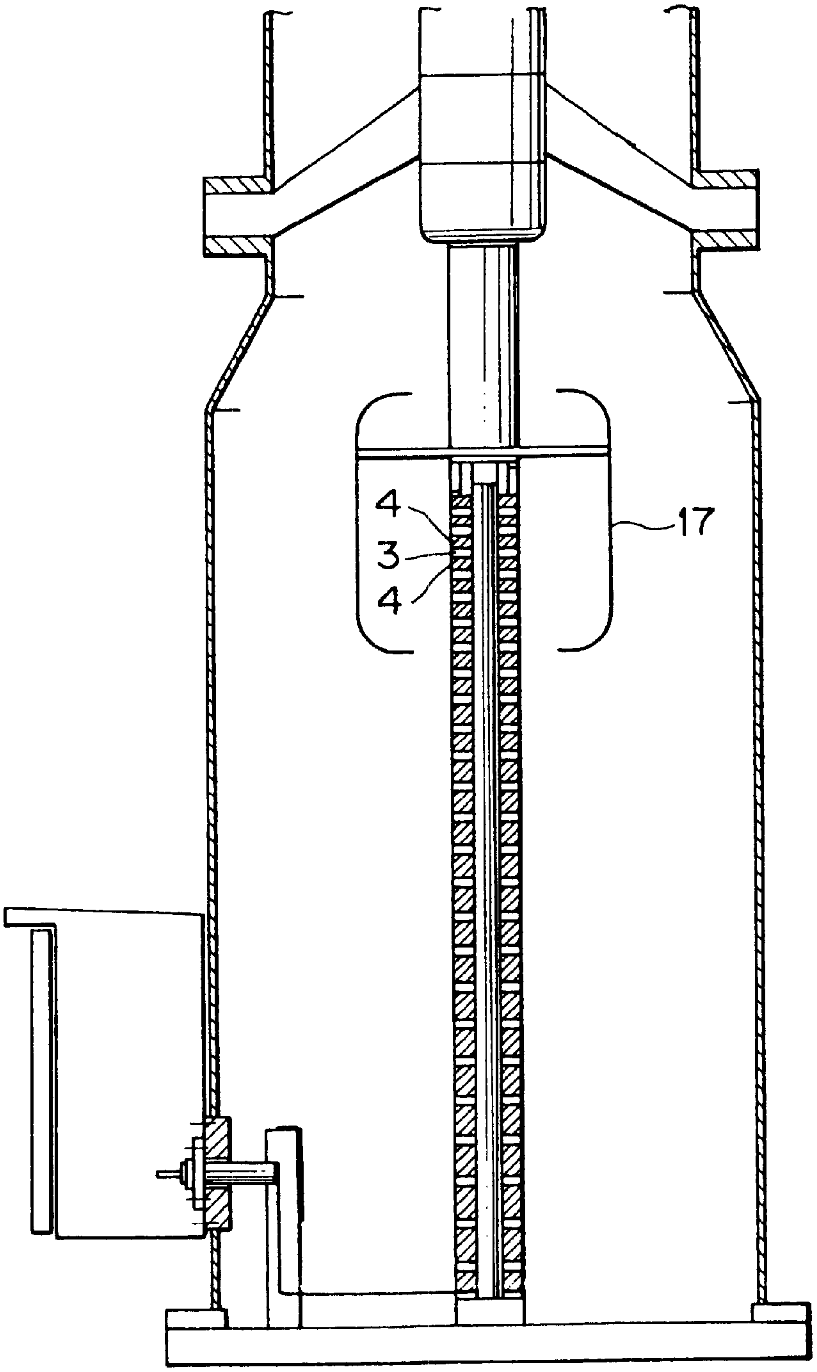
FIG. 9 is an internal construction view of a tank type arrester according to a fourth embodiment of the present invention.
Figure 10:
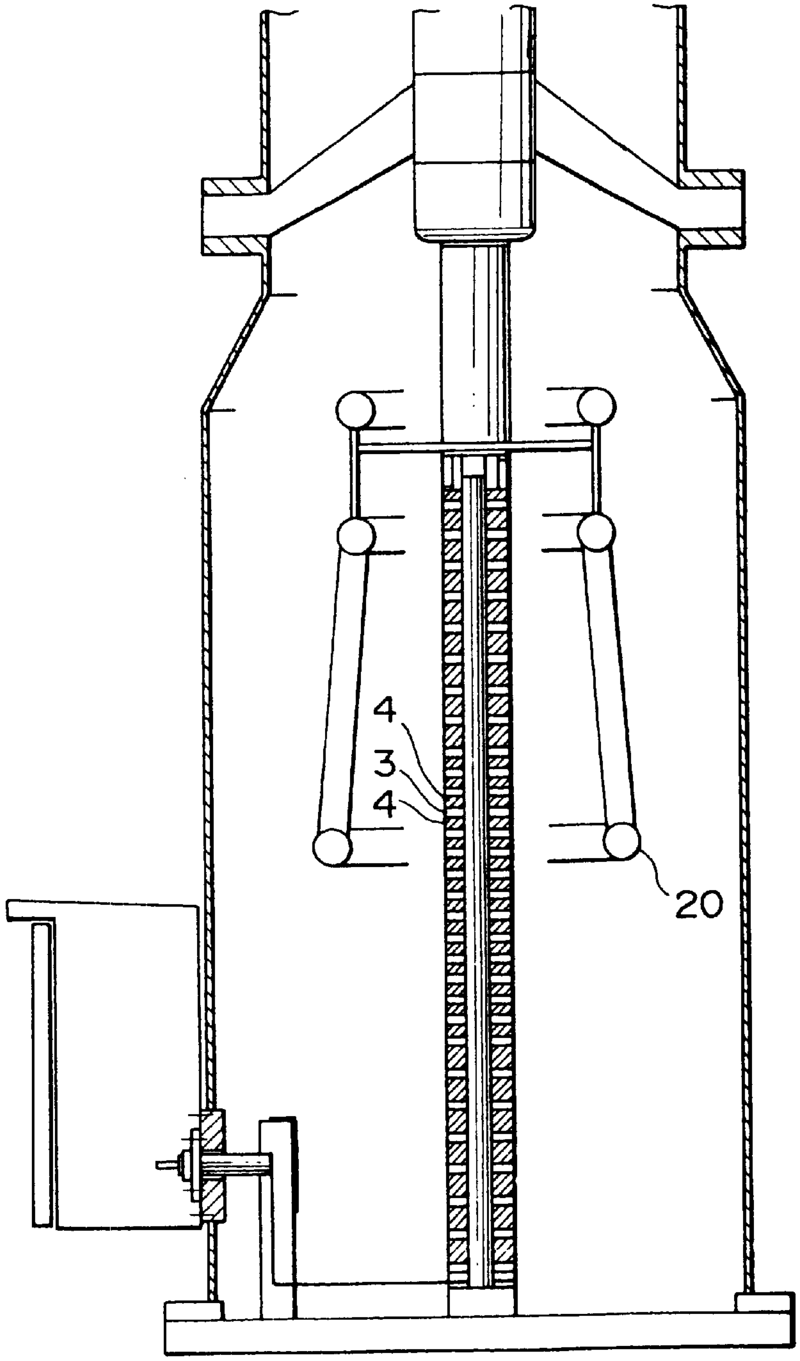
FIG. 10 is an internal construction view of a tank type arrester according to a fourth embodiment of the present invention.
Figure 11:
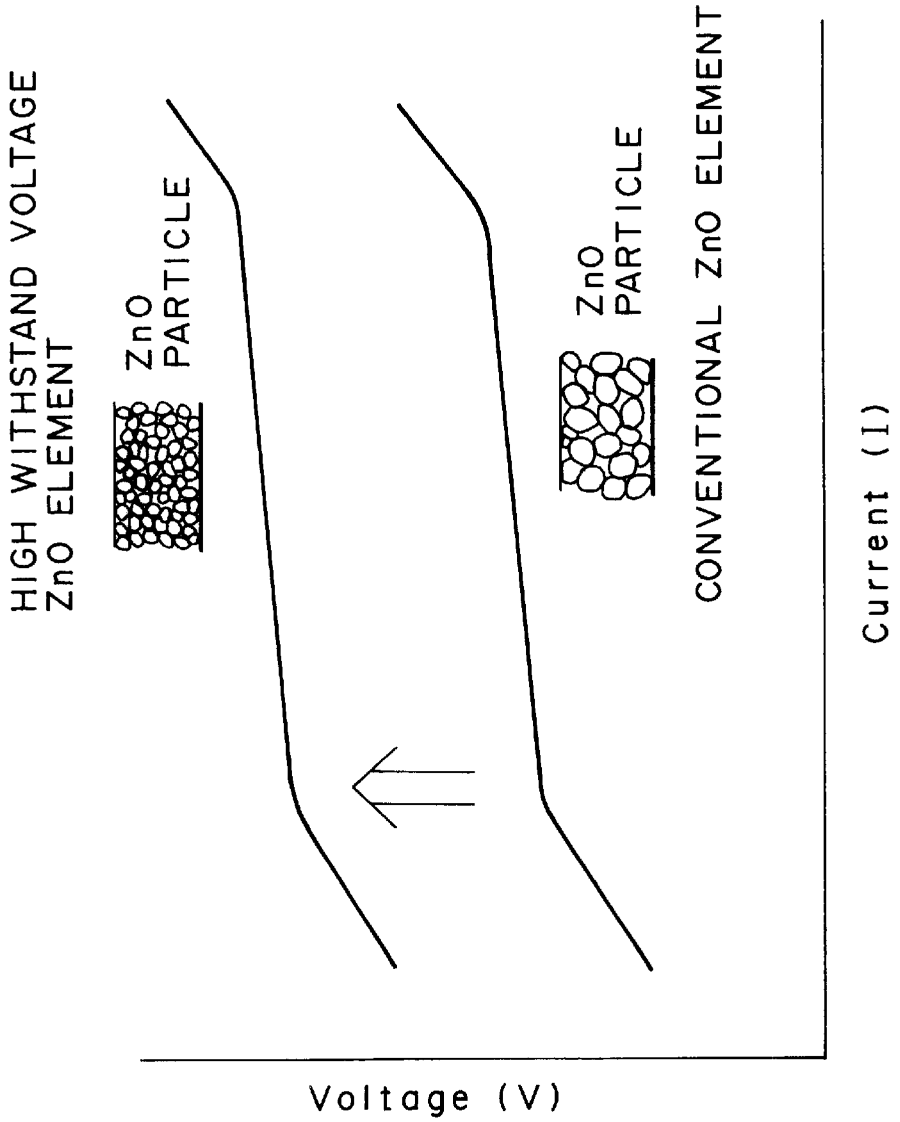
FIG. 11 shows a fine construction of conventional zinc oxide element and high withstand voltage zinc oxide element, and a voltage-current characteristic view.
Figure 12:
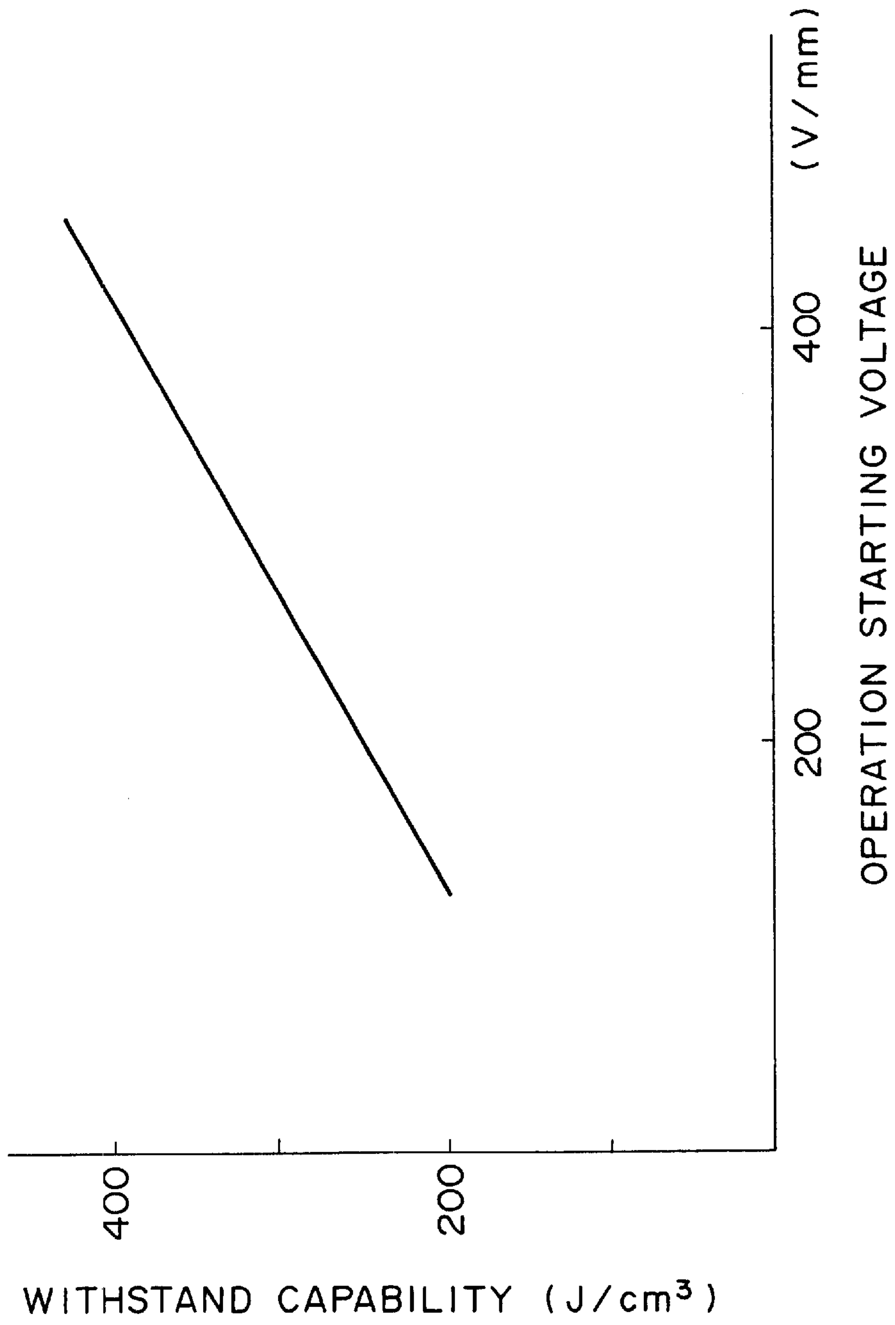
FIG. 12 shows a relational view between a conventional zinc oxide element and a withstand capability of a high withstand voltage zinc oxide element.
Figure 13:
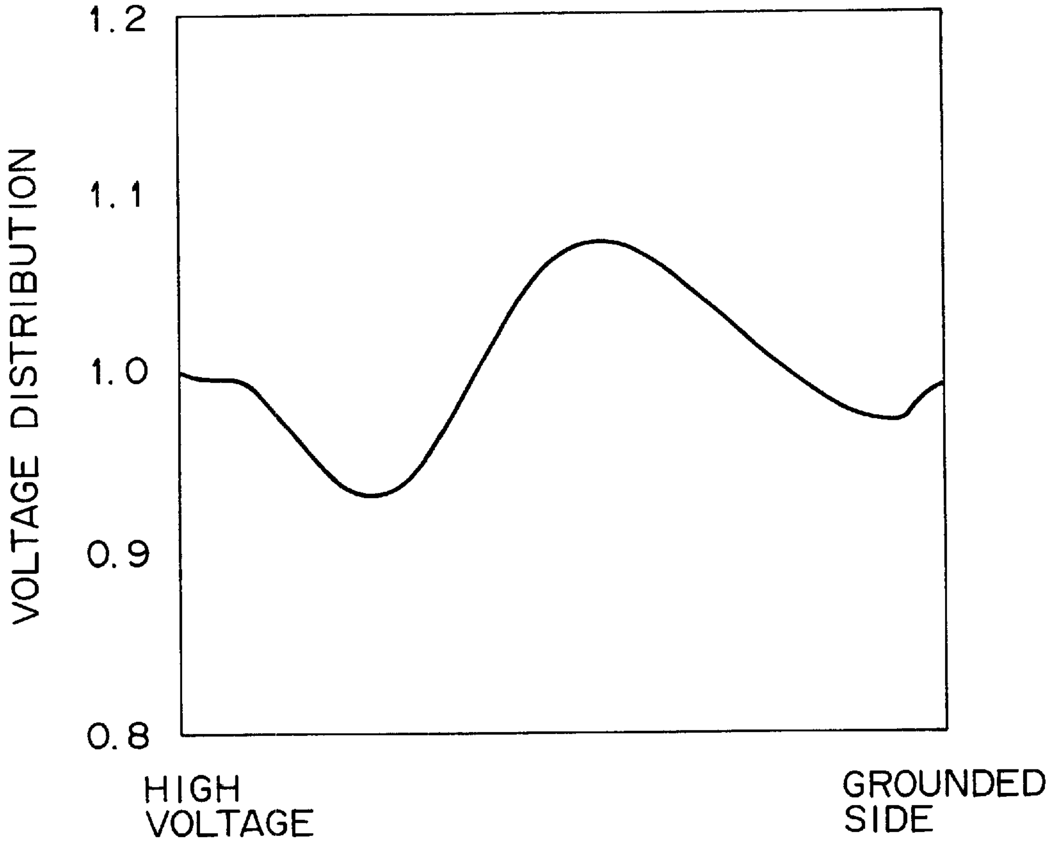
FIG. 13 is a voltage distribution view of a tank type arrester.

FIGS. 9 and 10 are respectively sectional views showing a construction of a tank type arrester. In FIG. 9, since a potential distribution between the zinc oxide elements is controlled by a head shield 17, the potential is concentrated on the head high voltage side. From the foregoing, by the adjustment of the thickness of the metal plate 4, many zinc oxide elements 3 are arranged on the head, and a portion which is low in the potential distribution can be constituted by thick metal plates 4. In FIG. 10, since the voltage distribution is controlled by a metal shield having a ring shield in the head, a potential is concentrated on the periphery of the ring shield, and many zinc oxide elements 3 are arranged on the said portion, and a portion which is low in the potential distribution can be constituted by thick metal plates 4, whereby the reckless thermal running of the zinc oxide elements of the tank type arrester and the enhancement of the high voltage life can be adjusted by the metal plates each having a thickness greater than the zinc oxide element does.

According to the first insulator type of the present invention, since the metal plates having a thickness greater than the zinc oxide elements are arranged on the upper and lower end of the zinc oxide elements, it is possible to absorb heat of the zinc oxide elements generated by a leaky current transitionally flowing into the zinc oxide elements due to the contamination of the porcelain bushing surface. Accordingly, it is possible to provide an insulator type arrester and a tank type arrester capable of suppressing a rise in temperature of the zinc oxide elements due to the contamination of the porcelain bushing surface.

According to the fourth tank type arrester of the present invention, the metal plates having a thickness greater than that of the zinc oxide elements are arranged vertically in the periphery of the shield on which electric field is concentrated, whereby the reckless thermal running of the zinc oxide elements of the tank type arrester and the enhancement of the high voltage life can be adjusted by the metal plates each having a thickness greater than the zinc oxide element does.

What is claimed is:

1. An arrester comprising at least a first stage and a second stage, wherein each of said first and second stage comprises:

a porcelain bushing;

an insulating tube provided within the porcelain bushing;

an insulating rod provided within the insulating tube;

a laminate body arranged around the insulating rod and being formed by a plurality of metal plates separated by zinc oxide elements;

a resilient member provided at one end of the laminate body for pressing the laminate body against the porcelain bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the thickness of the metal plates gradually increase along one direction of the porcelain bushing while the thickness of the zinc oxide elements remains constant.

2. An arrester comprising at least a first stage and a second stage, wherein each of said first and second stage comprises:

a porcelain bushing;

an insulating tube provided within the porcelain bushing;

an insulating rod provided within the insulating tube;

a laminate body arranged around the insulating rod and being formed by a plurality of metal plates separated by zinc oxide elements;

a resilient member provided at one end of the laminate body for pressing the laminate body against the porcelain bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the zinc oxide element has zinc oxide particles and a grain boundary of a metal additive.

3. An arrester comprising at least a first stage and a second stage, wherein each of said first and second stage comprises:

a porcelain bushing;

an insulating tube provided within the porcelain bushing;

an insulating rod provided within the insulating tube;

a laminate body arranged around the insulating rod and being formed by a plurality of metal plates separated by zinc oxide elements;

a resilient member provided at one end of the laminate body for pressing the laminate body against the porcelain bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the zinc oxide element has zinc oxide particles of particle size of 1 to 5 μm and a metal additive of particle size of 0.05 to 0.06 μm.

4. The arrester according to claim 2, wherein the metal additive has bismuth oxide, antimony oxide, cobalt oxide, manganese carbonate, chromium oxide, nickel oxide, boron oxide, magnesium carbonate, silver oxide, silicon oxide, and aluminum nitrate.

5. The arrester according to claim 3, wherein the metal additive has bismuth oxide, antimony oxide, cobalt oxide, manganese carbonate, chromium oxide, nickel oxide, boron oxide, magnesium carbonate, silver oxide, silicon oxide, and aluminum nitrate.

6. An arrester comprising at least a first stage and a second stage, wherein each of said first and second stage comprises:

a porcelain bushing;

an insulating tube provided within the porcelain bushing;

an insulating rod provided within the insulating tube;

a laminate body arranged around the insulating rod and being formed by a plurality of metal plates separated by zinc oxide elements;

a resilient member provided at one end of the laminate body for pressing the laminate body against the porcelain bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the zinc oxide element has characteristics of a operation starting voltage of 280 V/mm to 500 V/mm.

7. An arrester comprising at least a first stage and a second stage, wherein each of said first and second stage comprises:

a porcelain bushing;

an insulating tube provided within the porcelain bushing;

an insulating rod provided within the insulating tube;

a laminate body arranged around the insulating rod and being formed by a plurality of metal plates separated by zinc oxide elements;

a resilient member provided at one end of the laminate body for pressing the laminate body against the porcelain bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein each of the metal plates is formed from a plurality of smaller portions, each of the smaller portions having a thickness less that the thickness of each of the zinc oxide elements.

8. An arrester comprising at least a first stage and a second stage, wherein each of said first and second stage comprises:

a porcelain bushing;

an insulating tube provided within the porcelain bushing;

an insulating rod provided within the insulating tube;

a laminate body arranged around the insulating rod and being formed by a plurality of metal plates separated by zinc oxide elements;

a resilient member provided at one end of the laminate body for pressing the laminate body against the porcelain bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the metal plates have a thickness equal to the thickness of the zinc oxide elements in a portion where the electric field is strong, and wherein the metal plate have a thickness greater than the zinc oxide elements near the grounded side of the arrester.

9. An arrester comprising at least a first stage and a second stage, wherein each of said first and second stage comprises:

a porcelain bushing;

an insulating tube provided within the porcelain bushing;

an insulating rod provided within the insulating tube;

a laminate body arranged around the insulating rod and being formed by a plurality of metal plates separated by zinc oxide elements;

a resilient member provided at one end of the laminate body for pressing the laminate body against the porcelain bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the ratio between a limit voltage and an operating voltage of the arrester is in the range of 1.9 to 2.4.

10. An arrester comprising at least a first stage and a second stage, wherein each of said first and second stage comprises:

a porcelain bushing;

an insulating tube provided within the porcelain bushing;

an insulating rod provided within the insulating tube;

a laminate body arranged around the insulating rod and being formed by a plurality of metal plates separated by zinc oxide elements;

a resilient member provided at one end of the laminate body for pressing the laminate body against the porcelain bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein each of the metal plates has a thickness greater than the thickness of each of the zinc oxide elements.

11. An arrester comprising a plurality of stages, wherein each of said stages comprises:

a bushing;

an insulating tube provided within the bushing;

an insulating rod provided within the insulating tube;

a laminate body arranged around the insulating rod and being formed by a plurality of metal plates and zinc oxide elements, wherein the metal plates are laminated to opposite sides of the zinc oxide elements;

a resilient member provided at one end of the laminate body for pressing the laminate body against the bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the thickness of the metal plates gradually increase along one direction of the bushing while the thickness of the zinc oxide elements remains constant.

12. An arrester comprising a plurality of stages, wherein each of said stages comprises:

a bushing;

an insulating tube provided within the bushing;

an insulating rod provided within the insulating tube;

a laminate body arranged around the insulating rod and being formed by a plurality of metal plates and zinc oxide elements, wherein the metal plates are laminated to opposite sides of the zinc oxide elements;

a resilient member provided at one end of the laminate body for pressing the laminate body against the bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the zinc oxide element has zinc oxide particles and a grain boundary of a metal additive.

13. An arrester comprising a plurality of stages, wherein each of said stages comprises:

a bushing;

an insulating tube provided within the bushing;

an insulating rod provided within the insulating tube;

a laminate body arranged around the insulating rod and being formed by a plurality of metal plates and zinc oxide elements, wherein the metal plates are laminated to opposite sides of the zinc oxide elements;

a resilient member provided at one end of the laminate body for pressing the laminate body against the bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the zinc oxide element has zinc oxide particles of particle size of 1 to 5 $\mu$m and a metal additive of particle size of 0.05 to 0.06 $\mu$m.

14. The arrester according to claim 12, wherein the metal additive has bismuth oxide, antimony oxide, cobalt oxide, manganese carbonate, chromium oxide, nickel oxide, boron oxide, magnesium carbonate, silver oxide, silicon oxide, and aluminum nitrate.

15. The arrester according to claim 13, wherein the metal additive has bismuth oxide, antimony oxide, cobalt oxide, manganese carbonate, chromium oxide, nickel oxide, boron oxide, magnesium carbonate, silver oxide, silicon oxide, and aluminum nitrate.

16. An arrester comprising a plurality of stages, wherein each of said stages comprises:

a bushing;

an insulating tube provided within the bushing;

an insulating rod provided within the insulating tube;

a laminate body arranged around the insulating rod and being formed by a plurality of metal plates and zinc oxide elements, wherein the metal plates are laminated to opposite sides of the zinc oxide elements;

a resilient member provided at one end of the laminate body for pressing the laminate body against the bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the zinc oxide element has characteristics of a operation starting voltage of 280 V/mm to 500 V/mm.

17. An arrester comprising a plurality of stages, wherein each of said stages comprises:

a bushing;

an insulating tube provided within the bushing;

an insulating rod provided within the insulating tube;

a laminate body arranged around the insulating rod and being formed by a plurality of metal plates and zinc oxide elements, wherein the metal plates are laminated to opposite sides of the zinc oxide elements;

a resilient member provided at one end of the laminate body for pressing the laminate body against the bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein each of the metal plates is formed from a plurality of smaller portions, each of the smaller portions having a thickness less that the thickness of each of the zinc oxide elements.

18. An arrester comprising a plurality of stages, wherein each of said stages comprises:

a bushing;

an insulating tube provided within the bushing;

an insulating rod provided within the insulating tube;

a laminate body arranged around the insulating rod and being formed by a plurality of metal plates and zinc oxide elements, wherein the metal plates are laminated to opposite sides of the zinc oxide elements;

a resilient member provided at one end of the laminate body for pressing the laminate body against the bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the metal plates have a thickness equal to the thickness of the zinc oxide elements in a portion where the electric field is strong, and wherein the metal plate have a thickness greater than the zinc oxide elements near the grounded side of the arrester.

19. An arrester comprising a plurality of stages, wherein each of said stages comprises:

a bushing;

an insulating tube provided within the bushing;

an insulating rod provided within the insulating tube;

a laminate body arranged around the insulating rod and being formed by a plurality of metal plates and zinc oxide elements, wherein the metal plates are laminated to opposite sides of the zinc oxide elements;

a resilient member provided at one end of the laminate body for pressing the laminate body against the bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein the ratio between a limit voltage and an operating voltage of the arrester is in the range of 1.9 to 2.4.

20. An arrester comprising a plurality of stages, wherein each of said stages comprises:

a bushing;

an insulating tube provided within the bushing;

an insulating rod provided within the insulating tube;

a laminate body arranged around the insulating rod and being formed by a plurality of metal plates and zinc oxide elements, wherein the metal plates are laminated to opposite sides of the zinc oxide elements;

a resilient member provided at one end of the laminate body for pressing the laminate body against the bushing;

a metallic element connecting the first stage to the second stage;

wherein the insulating rod defines an axis which passes through both of said first and second stages;

wherein a point on said axis which corresponds to a midpoint between a lowermost zinc oxide element of the first stage and an uppermost zinc oxide element of the second stage is located within the metallic element; and wherein each of the metal plates has a thickness greater than the thickness of each of the zinc oxide elements.

* * * * *